United States Patent Office 2,817,534
Patented Dec. 24, 1957

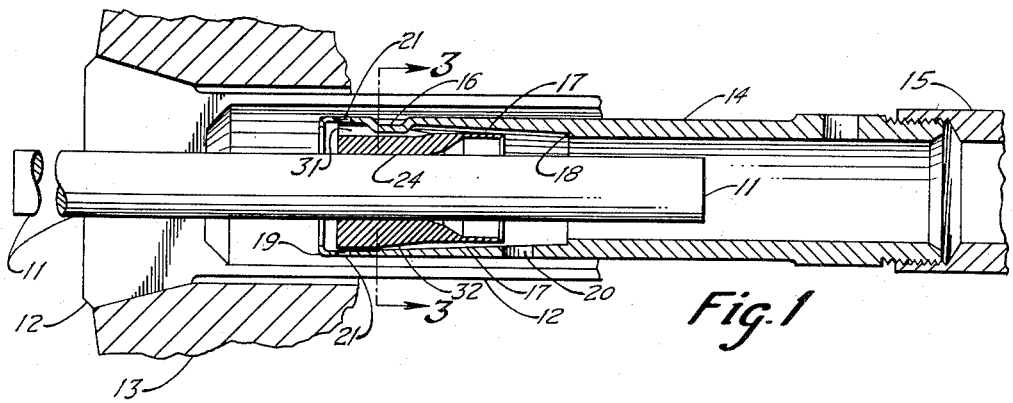

2,817,534
PUSHER DEVICE
John R. Cox, Lakewood, Ohio
Application March 8, 1956, Serial No. 570,345
7 Claims. (Cl. 279—50)

My invention relates to pushers for feeding stock into machines.

An object of my invention is to provide an improved pusher for feeding stock into a machine and having a construction which is more efficient and useful than others heretofore known.

Another object is the provision of a pusher which enables the internal gripping member to accommodate itself to the axial alignment of the stock.

Another object is the provision of a pusher which permits the stock being fed by the pusher to shift its axial position and still be firmly gripped by the pusher.

Another object is the provision of a two-piece pusher in which the internal gripping member is maintained within the external sleeve member by a novel and unique construction.

Another object is the provision for opposing tapered walls in a two-piece pusher in which one of the walls is on a relatively slow taper and the other wall is on a relatively fast taper.

Another object is the provision in a pusher of an internal gripping member which is biased to be out of round when not accommodating a piece of stock.

Another object is the provision of a gripping member in a pusher which changes its shape at different locations along the axial extent of the external sleeve member holding the gripping member.

Another object is the provision of a pusher in which the internal gripping member is so biased as to be retained within the external sleeve member of the pusher.

Another object is the provision in a pusher of a construction for retaining a stock-gripping member within the sleeve member of the pusher and between axial spaced limits within the sleeve member.

Another object is the provision for elimination of snap rings and other auxiliary parts for retaining a stock-gripping member within the external sleeve member of a pusher.

Another object is the provision of a construction of a pusher which has a maximum capacity for stock in proportion to the outer diameter of the pusher.

Other objects and a fuller understanding of my invention may be had by referring to the following description and claims, taken in conjunction with the accompanying drawings, in which:

Figure 1 is a longitudinal sectional view of a pusher embodying my device and showing the feeding of a piece of stock into a machine with the parts of the pusher in one relative position;

Figure 2 is a longitudinal view of my pusher, partially in section, and showing the parts of the pusher in another relative position;

Figure 3 is an enlarged cross-sectional view of my pusher taken along the line 3—3 of Figure 1;

Figure 4 is an end view of the gripping member of my pusher device looking in the direction of the arrows 4—4 of Figure 5;

Figure 5 is a side elevational view of the gripping member of my pusher removed from the sleeve member; and Figure 6 is a longitudinal sectional view of the forward end of my pusher and showing the manner of removal of the internal gripping member from the sleeve member.

In the illustration of the use of my pusher, a cylindrical piece of bar stock 11 is fed into a machine for a desired operation. The stock is advanced to be held by a collet chuck 12 of the machine. This collet chuck 12 is reciprocated by a suitable mechanism, in a tapered sleeve 13 so that the jaws of the split collet chuck may alternately grip and release the bar stock as required.

My pusher is comprised of two pieces or parts—a sleeve member 14 and a gripping member 24. The sleeve member 14 is hollow and cylindrical in form and is threadably secured to and carried by a supporting arm 15 which is reciprocated along the axis of the sleeve member 14 by a suitable mechanism. Adjacent the forward end of the sleeve member 14 there is an inner tapered wall 17, which extends from a forward flange or inwardly turned portion 19 rearwardly and inwardly to an annular shoulder 18. The inclination of the frusto-conical wall 17 is such that it is herein referred to as being on a relatively slow taper. The annular flange 19 at the extreme forward end of the sleeve member 14 and the annular shoulder 18 provide limit stops between which the gripping member 24 may reciprocate relative to the sleeve member 14.

At one point around the circumferential extent of the sleeve member 14 there is a key portion 16 extending radially inward as indicated in the drawing. Extending through the wall of the sleeve member 14 in the vicinity of the shoulder 18 is a hole 20, this hole being adapted to accommodate a stop pin which may be inserted into the sleeve member to prevent the rearward movement of the gripping member 24 when desired.

The gripping member 24 has an annular ring portion 25 at its rearward end. There are four slits 26 equidistantly spaced apart around the circumference of the gripping member and extending forwardly from the ring portion 25 to provide four resilient fingers 27, 28, 29 and 30. The gripping member 24 is of heat-treated steel so constructed and treated that the fingers may resiliently move or swing radially inward and outward. The material of the gripping member is such that the ring portion 25 accommodates itself to the resilient flexing of the fingers and by yieldable distortion permits the fingers to flex as required.

The finger 29 has a longitudinally extending key-way 31 in which the key portion 16 is positioned. The interfit of the key portion 16 and the key-way 31 is such that the gripping member 24 may move longitudinally within the sleeve 14 but the gripping member is retained against rotational movement within the sleeve member.

The gripping member 24 has its fingers so biased or pre-stressed in the heat-treating and forming operation that opposite fingers 29 and 30 are normally positioned at one radial distance from the longitudinal axis of the gripping member and the other opposing fingers 27 and 28 are normally positioned at another radial distance from the longitudinal axis of the gripping member. The fingers 27 and 28 are biased to be closer to the axis than are the fingers 29 and 30. The gripping member in an unstressed and normal position and in the absence of a piece of stock 11 therein, assumes the shape of Figure 4. As is seen in the view of Figure 4, the inner bore of the gripping member 24 is at this time of an oval or elliptical shape. By reason of the resiliency of the fingers, the gripping member assumes a round shape in cross-section, as illustrated in Figure 3, when a piece of stock 11 is within the bore of the gripping member. When the fingers 27 and 28 are pressed radially outward by the stock, the fingers 29 and 30 are moved radially inward against the stock. This action is obtained by the twisting or buckling of the ring portion 25. The ring portion 25 is so yieldably distortable that as the fingers 27 and 28 are forced apart, the fingers 29 and 30 are moved radially inward until the parts assume the relative position shown in Figure 3.

The gripping member 24 has an outer tapered wall 32 of frusto-conical form. The inclination of this frusto-conical wall 32 is such that it is referred to as being on a relatively fast taper. In other words, the inclination of the wall 32 on the gripping member 24 is at one angle to the axis of the pusher and the inclination of the tapered wall 17 of the sleeve member is at another angle of the axis of the pusher, the included angle of the wall 32 to the axis being greater than the included angle of the wall 17 to the axis. For this reason, the wall 32 is herein referred to as being on a relatively fast taper and the wall 17 is herein referred to as being on a relatively slow taper.

Forwardly of the tapered wall 32, the gripping member 24 has a cylindrical outer wall 33. The forward cylindrical wall 33 and the tapered wall 32 met at a junction indicated by the reference character 34, this junction 34 extending circumferentially around the gripping member. In the initial manufacture of the gripping member, there is theoretically an angle at the junction 34, this being the included angle between the walls 33 and 32. However, in the use of the pusher, the gripping member 24 may shift its angular position relative to the axis of the sleeve member 14 so as to accommodate any discrepancies in the axial alignment of the stock 11 and the sleeve member 14. By this angular shifting of the gripping member 24 relative to the sleeve member 14, the junction 34 quickly becomes worn by its engagement with the wall 17 of the sleeve member so that in effect it becomes a ball-and-socket joint between the gripping member 24 and the sleeve member 14. The included angle at the junction 34 is of such a degree that the gripping member readily shifts in a ball-and-socket movement within the sleeve member even before any appreciable wear at the locality of the junction 34.

By reason of the difference in the tapers of the walls 32 and 17, there is not a complete engagement of the walls 32 and 17 along their length, even when the gripping member 24 is moved rearwardly relative to the sleeve member. A relatively quick gripping action is obtained on the stock 11 with a relatively short stroke and also a relatively quick release is obtained on the stock by a relatively short stroke in an opposite direction.

Upon reciprocal movement of the sleeve member 14 to the left in Figure 1, that is, toward the collet chuck 12, the gripping member 24 initially takes a slight grip upon the stock 11 and then as the sleeve member 14 is moved further to the left, the camming action of the opposed tapered walls 32 and 17 cause the fingers of the gripping member to be pressed radially inward in firm engagement with the stock 11. In this movement, the gripping member 24 is moved back toward the shoulder 18 and the stock 11 is fed into the collet chuck 12, then in a released condition.

Upon reciprocal movement of the sleeve member 14 to the right as in Figure 2, that is, by a withdrawing motion, the gripping member 24 is moved forwardly in the sleeve member 14 to where it is in engagement with the forward flange 19, this flange 19 preventing withdrawal of the gripping member 24 from the sleeve member 14. At this location, the major gripping action on the stock 11 is by the fingers 27 and 28, while the fingers 29 and 30 have been permitted to move radially outward and not pressed as firmly upon the stock 11 as are the fingers 27 and 28. By reason of the position of the tapered walls 32 and 17, the gripping member 24 is in a relatively released or relaxed condition so that the sleeve member 14 may move to the right preparatory to another stroke while the stock 11 is held in fixed position by the collet chuck 12.

When it is desired to remove the gripping member 24 from the sleeve member 14, such as for replacement of the gripping member 24, it is necessary to compress the fingers of the gripping member in such a manner that they will clear the forward flange 19 of the sleeve member 14. This is accomplished by providing four threaded openings 21 in the sleeve member 14 near its forward end at equidistant locations around its circumference. Four threaded thumb-gripping bolts 22 are provided to threadably engage in the threaded openings 21, respectively. By moving the gripping member 24 to its forward position within the sleeve member 14 and by turning the bolts 22 so as to press the four fingers radially inward, the fingers may clear the flange 19 as illustrated in Figure 6. After the four fingers of the gripping member are so compressed as shown in Figure 6 and the gripping member is moved forward sufficiently to clear the flange 19, then the bolts 22 may be removed and the gripping member 24 may be readily driven forwardly out of the sleeve member.

In the reciprocating movement of the sleeve member 14 toward and away from the collet chuck 12 to intermittently feed the stock to the machine, it is seen that there is a relative movement between the sleeve member and gripping member. The tension of the gripping member 24 on the stock 11 is such as to positively grip the stock 11 when the gripping member 24 and the sleeve member 14 are moved relative to each other so as to bring the gripping member 24 toward the annular shoulder 18. This positive grip is provided by the camming action of the opposing tapered walls 17 and 32. Any deviation from true axial alignment of the stock 11 relative to the sleeve member 14 is readily accommodated by the ball-and-socket movement permitted by the junction 34 engaging the wall 17. Upon movement of the sleeve member 14 in an opposite direction, the tension of the fingers, and particularly fingers 27 and 28 of the gripping member, is such as to sufficiently grip the stock 11 so that the gripping member 24 drags behind to maintain engagement with the stock 11. In other words, the withdrawing movement of the gripping member 24 lags the withdrawing movement to the right of the sleeve member 14. This drag of the gripping member 24 on the stock 11 and hence its lagging of the withdrawing motion of the sleeve member 14 causes the gripping member 24 to be moved into the forward end of the sleeve member 14, that is, to the position shown in Figure 2. In this position, it is ready for another stroke of the sleeve member and another forward feeding of an increment of stock into the collet chuck 12 of the machine.

Upon the pusher moving the last piece or increment of stock 11 toward the collet chuck 12 of the machine, there is an engagement of the end face of the stock 11 with the forward end face of the gripping member 24 because the gripping member 24 not holding a piece of stock 11 assumes the oval shape shown in Figure 4. A forward stroke of the sleeve member 14 might thus force the gripping member 24 rearwardly to such an extent as to jam within the sleeve member 14. However, the shoulder 18 limits this possible rearward movement of the gripping member 24 within the sleeve member 14. Throughout the permissible movement of the gripping member 24 in the sleeve member 14, the key portion 16 is maintained within the key-way 31.

It may be noted that the disclosed construction does not require auxiliary parts, such as snap rings and other external and added parts, to maintain the gripping member within the sleeve member. A piece of stock of maximum diameter may be accommodated in this pusher in respect to the maximum diameter of the pusher. The pusher device is simple in construction and yet performs in a novel manner to produce unique results not heretofore obtainable in devices of this class.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A pusher for feeding stock forwardly therethrough comprising a sleeve member having an internal bore, the wall of said bore at the forward end of the sleeve member being inclined to taper rearwardly and radially inwardly at a first angle to the axis of the sleeve member, said sleeve member having a stop portion adjacent the forward end thereof and protruding radially inward into said bore, and a gripping member positioned in said bore and having an opening extending therethrough for accommodating said stock, said gripping member having an annular portion and resilient feed fingers extending forwardly therefrom along said opening, said feed fingers having pad portions facing said opening adapted to engage said stock, said gripping member having an outer wall, said outer wall along a portion spaced from the ends of the gripping member and along said feed fingers being inclined to taper rearwardly and radially inwardly at a second angle to the axis of the gripping member, said second angle being greater than said first angle, said gripping member adjacent the forward end of said tapered outer wall being adapted to engage the tapered inner wall of said sleeve member to provide for gripping and releasing stock by said gripping member upon relative reciprocal movement between said gripping member and said sleeve member, the said feed fingers being divided into opposed groups, the fingers of one opposed group being biased to extend a greater radial distance from the axis of the gripping member than the fingers of another opposed group, said relative reciprocal movement between said gripping member and sleeve member causing the fingers of one group of fingers to move radially in a direction radially opposite to the movement of the fingers of said another group of fingers, the fingers of said one opposed group extending radially outward at the forward end of the sleeve member in axial alignment with said stop portion to retain said gripping member in the bore of the sleeve member rearwardly of the stop portion.

2. In a pusher device, the combination of an internally tapered sleeve member and an externally tapered gripping member positioned therein, the tapers of said members being wholly within the axial extent of said sleeve member and being opposed to operate the gripping member upon reciprocal movement of one member relative to the other member, said tapers extending radially inward and rearwardly to compress said gripping member upon positioning of the tapered portion of the gripping member at a location rearwardly of the forward end of the sleeve member, said gripping member having a plurality of forwardly extending resilient fingers adapted to resiliently grip stock therebetween and having a resiliently distortable rearward portion connecting said fingers, said rearward portion joining said fingers in a complete annulus of resilient heat-treated steel, opposed fingers in one axially extending plane being biased to normally be spaced a first radial distance from the axis of the gripping member, opposed fingers in a second axially extending plane normal to the said first plane being biased to normally be spaced a second and greater radial distance from the axis of the gripping member, inward flexing of the opposed fingers in one plane distorting said rearward portion to outwardly flex the opposed fingers in the other plane, said sleeve member at the forward end thereof having an internal diameter less than the maximum diameter of said gripping member across the fingers in said second axially extending plane whereby said gripping member at a location adjacent the forward end of the sleeve member is retained in the sleeve member.

3. In a pusher, the combination of a sleeve member and a gripping member for holding stock, said gripping member being positioned in said sleeve member to permit relative reciprocal movement therebetween, said members having opposed tapered walls disposed wholly within said sleeve member and adapted to open and close said gripping member to release and grip said stock, said gripping member having an annular bearing portion adjacent the tapered wall thereof adapted to engage the tapered wall of said sleeve member to provide a slipping engagement between said gripping member and sleeve member for permitting angular tilting of said gripping member relative to said sleeve member, said annular bearing portion being positioned rearwardly of the forward end of said sleeve member and said gripping member forwardly of said annular bearing portion in the closed condition of the gripping member being spaced radially inward from the tapered wall of said sleeve member to permit said angular tilting of the gripping member within the sleeve member.

4. In a pusher, the combination of a sleeve member, a stock gripping member positioned in the sleeve member to permit relative reciprocal movement of one member relative to the other, camming means between said sleeve member and gripping member to operate the gripping member upon relative reciprocal movement between said members, and slipping engagement means between said sleeve member and gripping member at a location axially spaced from the forward end of the sleeve member to permit said gripping member to shift its axial disposition relative to the axis of said sleeve member, said gripping member forwardly of said location being spaced radially inward from the internal wall of said sleeve member upon said relative movement to the gripped condition of the gripping member to permit said shift in axial disposition.

5. In a pusher, a sleeve member and a gripping member positioned in the bore of the sleeve member, said gripping member having a plurality of axially extending resilient fingers, said fingers being biased to form in unrestrained condition an out-of-round outer peripheral edge at the forward end of the gripping member to provide a first portion of said peripheral edge of greater diameter than a second portion of said peripheral edge, said sleeve member at the forward end thereof having a stop portion extending radially inward in axial alignment with the said bore of the sleeve member to a position in axial alignment with said first portion in said unrestrained condition of the said fingers, said gripping member in unrestrained condition being positioned rearwardly of said stop portion and being opposed by said stop portion upon forward movement of the gripping member relative to the sleeve member to retain the gripping member in the sleeve member, said gripping member adjacent the rearward end of said gripping member having a resilient portion in complete annular form to provide that flexing of a resilient finger in one direction distorts the resilient portion to effect flexing of the next adjacent fingers in an opposite direction.

6. In combination, a sleeve member, a stock-gripping member in the bore of the sleeve member adjacent its forward end, said members being reciprocal relative to each other to operate said gripping member, said gripping member being biased to be out-of-round at its forward end upon the absence of stock within the gripping member exerting a restraining force urging the gripping member to round shape at its forward end to provide a first portion of major diameter and a second portion of minor diameter at said forward end, said sleeve member having a stop portion at its forward end positioned in axial alignment with, and adapted to engage, said second portion of the gripping member in an out-of-round shape upon reciprocal movement of the members in one direction to thereby restrain the gripping member within the sleeve member, the forward end of the gripping member in its out-of-round shape being positioned rearwardly of said stop portion.

7. In a pusher, a gripping member adapted to be positioned in a sleeve member for relative reciprocal movement therebetween, said gripping member having a tapered wall intermediate its ends cooperable with the sleeve member for operating the gripping member, said gripping member having four forwardly extending resilient fingers and a resiliently distortable complete ring portion at its rearward end joining adjacent said fingers, the two opposed fingers in one plane being biased radially outward a greater distance from the axis of the gripping member than the two opposed fingers in a second plane normal to said one plane, said complete ring portion resiliently yielding upon radial movement in one direction of the opposed fingers in one of said planes to cause radial movement in an opposite direction of the opposed fingers in the other plane, said fingers being resiliently movable to be substantially equally spaced from said axis by stock within the bore of the gripping member pushing radially outward on the two opposed fingers in said second plane.

References Cited in the file of this patent

UNITED STATES PATENTS

| | | |
|---|---|---|
| 2,228,685 | Benjamin | Jan. 14, 1941 |
| 2,310,259 | Ruppel | Feb. 9, 1943 |
| 2,479,076 | Martin | Aug. 16, 1949 |
| 2,752,161 | Smrekar | June 26, 1956 |